United States Patent Office
3,799,935
Patented Mar. 26, 1974

3,799,935
SUBSTITUTED AMINOHALO-PYRIDINES
Howard Johnston, Walnut Creek, Calif., assignor to The Dow Chemical Company, Midland, Mich.
No Drawing. Application Nov. 13, 1970, Ser. No. 90,442, which is a continuation-in-part of abandoned application Ser. No. 880,422, Nov. 26, 1969, which in turn is a continuation-in-part of abandoned application Ser. No. 807,979, Mar. 17, 1969. Divided and this application Oct. 10, 1972, Ser. No. 296,298
Int. Cl. C07d 31/46
U.S. Cl. 260—294.9
4 Claims

ABSTRACT OF THE DISCLOSURE

Disclosed as novel compounds are amino and halo substituted pyridines which are further substituted with cyano, trichloromethyl or dichloromethyl groups. The compounds have utility as pesticides and find particular usage as fungicides, bactericides and insecticides.

CROSS-REFERENCE TO RELATED APPLICATIONS

This is a division of application Ser. No. 90,442 filed Nov. 13, 1970 which in turn is a continuation-in-part of application Ser. No. 880,422, filed Nov. 26, 1969, now abandoned, which in turn is a continuation-in-part of application Ser. No. 807,979, filed Mar. 17, 1969, now abandoned.

SUMMARY OF THE INVENTION

The novel compounds of this invention are substituted aminohalopyridines corresponding to the formula

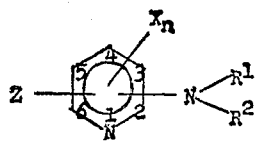

(Formula I)

In this and succeeding formulae, X represents chlorine, bromine, iodine or fluorine; n represents an integer of 1 or 2; Z represents cyano, dichloromethyl or trichloromethyl; $R^1$ represents hydrogen, loweralkyl of 1 to 4 carbon atoms or loweralkenyl of 2 to 4 carbon atoms; $R^2$ represents hydrogen, loweralkyl of 1 to 4 carbon atoms, amino, loweralkenyl of 2 to 4 carbon atoms, cycloalkyl of 3 to 4 carbon atoms or phenyl; or both $R^1$ and $R^2$ taken together with the nitrogen atom represents pyrrolidino or piperidino; with the proviso that —$NR^1R^2$ cannot be in the 3 or 5 ring position and when Z is dichloromethyl or trichloromethyl, it cannot be in the 3 or 5 ring position and with the further proviso that when —$NR^1R^2$ is in the 4 ring position, Z cannot be in the 2 or 6 ring positions.

Representative compounds defined by the disclosure directly hereinbefore are shown by the sub-Formulae II–VIII wherein X, n, $R^1$ and $R^2$ are as hereinbefore defined:

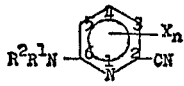 ,  ,

Formula II        Formula III

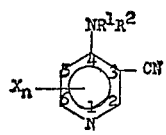 , 

Formula IV        Formula V

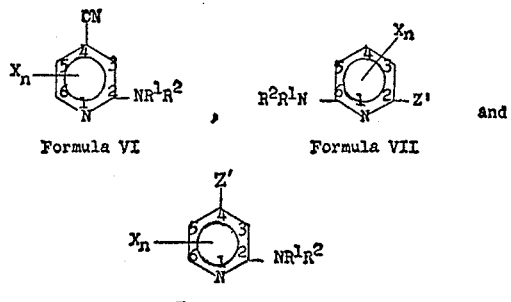

Formula VI        Formula VII and

Formula VIII wherein Z' is either dichloromethyl or trichloromethyl.

"Loweralkyl," as employed in the present specification and claims, designates an alkyl group containing 1, 2, 3 or 4 carbon atoms, namely, methyl, ethyl, n-propyl, isopropyl, secondary butyl, n-butyl and isobutyl. "Cycloalkyl" designates cycloalkyl groups containing from 3 to 4 carbon atoms, inclusive, such as cyclopropyl and cyclobutyl. "Alkenyl" designates alkenyl groups, each of which contains from 2 to 4 carbon atoms, inclusive, such as vinyl, allyl and methylallyl.

For convenience of description, the compounds coming within the scope of the above formulas, as defined hereinabove, are referred to in the specification and claims as "substituted aminohalopyridine" compounds or simply as "substituted" compounds or "substituted pyridine" compounds.

The novel substituted pyridine componds of this invention are white, beige or yellow crystalline or waxy solids or liquids, and they are generally insoluble or of low solubility in water and of moderate to high solubility in organic solvents such as acetone, benzene, xylene, ethanol, isopropyl alcohol, dimethylformamide and dimethylsulfoxide. The compounds of the invention are useful in the control of fungal and bacterial pests and are generally of low mammalian toxicity. They also find application as constituents of various anthelmintic compositions.

Depending on the nature of Z substituent on the pyridine ring, the compounds of this invention can be prepared by reacting a suitable nitrogen base ($HNR^1R^2$, wherein $R^1$ and $R^2$ are as defined above) with an appropriately substituted pyridine reactant.

The following reaction scheme illustrates the preparation of the novel compounds of the present invention

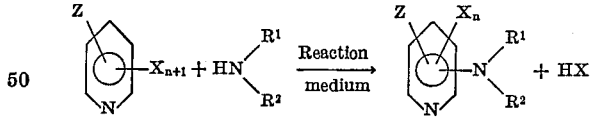

wherein Z, X, n, $R^1$ and $R^2$ are as hereinbefore defined.

In the ensuing reaction, there is formed the desired aminopyridine derivative together with hydrogen halide as a by-product. The reactants are customarily employed in molar proportions of about 1.5 to 4.0 moles of the nitrogen base for each mole of the pyridine reactant. The hydrogen halide formed during the reaction can be taken up by the excess of the non-pyridine reactant in the form of a salt. When ammonia or a gaseous or a low boiling liquid amine is the nitrogen base reactant, the reaction can be carried out at temperatures of about 75° to 150° C. in a pressure vessel, i.e. bomb, at autogenous pressures for about ½ to 4 or more hours. In an alternative method, the gaseous nitrogen base is bubbled through a solution of the pyridine reactant in a solvent such as isopropanol or dimethylsulfoxide for ½ to 10 or more hours as the reaction mixture is maintained at from about 60° to 135° C. or at reflux. With other nitrogen bases, the reaction is carried out by mixing or stirring the reactants in a solvent such as toluene, ethanol, isopropanol, dimethylsulfoxide, benzene, dimethoxyethane or dimethylformamide at temperatures of from about 60° to 150° C., or at reflux, for periods of from ½ to 24 hours or more. At the end of the reaction the desired compound can be recovered and purified according to conventional procedures. For example, the salt formed during the reaction can be filtered off when present as a solid or the reaction mixture can be washed with water to remove the salt. The desired pyridine derivatives can then be further purified by recrystallization from a solvent, if desired.

Alternatively, the desired compounds of the present invention can be prepared from pyridine compounds which contain less than the number or kind or ring halogen atoms necessary to give the desired final product. In such procedures, a pyridine compound containing the desired Z substituent, but containing less than the number of halogen atoms necessary to give the desired final product, is first reacted with an appropriate nitrogen base (as hereinafter defined) under reaction conditions hereinabove set forth. The aminated product is thereafter halogenated to the desired final product employing conventional pyridine halogenation conditions such as those hereinafter set forth under the heading "Preparation of Starting Materials."

By following the above procedure, products containing mixed ring halogen atoms can be easily prepared.

In many cases during the preparation of the compounds of the present invention, positional isomers of the desired compounds are inherently prepared in addition to said desired compounds. These isomers can be separated employing conventional techniques such as, for example, preparative vapor phase chromatography, fractional crystallization, gel permeation chromatography, distillation and acid salt formation and many others which would be apparent to the skilled chemist.

In an alternative method, the compounds of the present invention wherein Z is dichloromethyl can also be prepared from the corresponding trichloromethyl compound by electrolytic reduction.

Suitable nitrogen bases which can be employed in the foregoing reaction, in addition to ammonia, include methylamine, ethylamine, n-propylamine, isobutylamine, sec.-butylamine, dimethylamine, diethylamine, diisopropylamine, ethylmethylamine, methylisopropylamine, methyl-sec.-butylamine, ethylpropylamine, and other dialkylamines; allylamine, methylallylamine, cyclopropylamine, cyclobutylamine, pyrrolidine, piperidine, 3-ethylpiperidine, 2-methylpiperidine, 3-methylpiperidine, 2,6-dimethylpiperidine, 4-ethylpiperidine, 2-ethylpiperidine, and other non-aromatic heterocyclic amines and hydrazines.

The compounds of the present invention can be prepared by adaptations of procedures known to the skilled in the art. Thus, it is to be understood that modifications of other methods known in the art for the preparation of compounds having similar amino and amino derivative groups may be substituted for the above procedures.

DESCRIPTION OF THE PREFERRED EMBODIMENTS

The following examples illustrate the invention but are not to be construed as limiting:

EXAMPLE 1

2-chloro-6-(1-pyrrolidinyl)-4-(trichloromethyl) pyridine

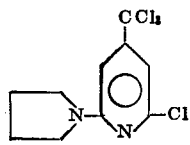

In this operation 13.5 grams (0.05 mole) of 2,6-dichloro-4-(trichloromethyl) pyridine and 8.3 grams (0.1 mole) of pyrrolidine are dissolved in 50 ml. hexane and the resulting solution is refluxed, with stirring, for 2 hours. The insoluble pyrrolidine hydrochloride is filtered off and the filtrate is slurried with Norit activated carbon and Celite clay and filtered. The filtrate, on being cooled, precipitates out 12 grams of a tan colored crystalline product which has a melting point of 61°–63° C. and is substantially insoluble in water and of good solubility in acetone and benzene. It is identified by infrared and nuclear magnetic resonance (NMR) methods of analysis as 2-chloro-6-(1-pyrrolidinyl)-4-(trichloromethyl) pyridine. Elemental analysis discloses the product to have carbon, hydrogen, chlorine and nitrogen contents of 40.51, 3.62, 46.78 and 9.42 percent, respectively, as against theoretical values of 40.0, 3.34, 47.2 and 9.33 percent, respectively, for the subject compound.

EXAMPLE 2

2-amino-6-chloro-4-(trichloromethyl) pyridine

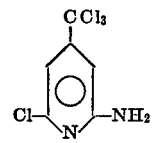

Fifteen grams (0.06 mole) of 2,6-dichloro-4-(trichloromethyl) pyridine are placed in a glass-lined pressure vessel along with 40 ml. of anhydrous ammonia. The vessel is sealed and heated at 100° C. for 2 hours under autogenous pressures. At the end of this time, the contents of the vessel are removed, excess ammonia is evaporated off. The light brown residue is washed with water, dissolved in ethanol and treated with activated carbon. After filtration, water is added to the filtrate and the solution cooled to precipitate 11 grams of a light yellow crystalline product, having a melting point of 110°–112° C., which is substantially insoluble in water and of good solubility in acetone and benzene. This product is identified by infrared and NMR methods of analysis as 2-amino-6-chloro-4-(trichloromethyl) pyridine. Elemental analysis discloses the product to have carbon, hydrogen nitrogen and chlorine contents of 29.19, 1.50, 11.34 and 57.78 percent, respectively, as against theoretical values of 29.0, 1.64, 11.5 and 58.8 percent, respectively, for the subject compound.

EXAMPLE 3

2-amino-6-fluoro-4-(trichloromethyl) pyridine

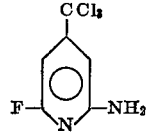

In a preparation similar to that of Example 2, 2-amino-6-fluoro-4-(trichloromethyl) pyridine, as a pale yellow crystalline solid melting from 75°–77° C., is prepared by heating together for 2 hours at 100° C. in a pressure vessel, 2,6-difluoro-4-(trichloromethyl) pyridine and anhydrous ammonia. The compound is insoluble in water and of good solubility in acetone and benzene.

EXAMPLE 4

2-chloro-6-(methylamino)-4-(trichloromethyl) pyridine

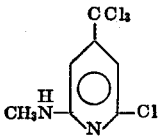

In this operation 10.6 grams (0.04 mole) of 2,6-dichloro-4-(trichloromethyl) pyridine and 5.0 grams (0.16 mole) of methylamine are dissolved in 100 ml. ethanol, and the solution is heated under reflux conditions for 4 hours. The solution is cooled and poured into 300 ml.

water, following which the solid material present is filtered off, leaving the amine hydrochloride salt present in solution. The product is then taken up in hexane and recrystallized therefrom. There is recovered 5.5 grams of an off-white crystalline solid having a melting point of from 122°–123° C. which is substantially insoluble in water and of good solubility in acetone and benzene. This material is identified by infrared and NMR methods of analysis as 2-chloro-6-(methylamino)-4-(trichloromethyl) pyridine. Elemental analysis discloses the product to have carbon, hydrogen, chlorine and nitrogen contents of 32.6, 2.2, 55.28 and 11.4 percent, respectively, as against theoretical values of 32.4, 2.31, 54.4 and 10.75 percent, respectively, for the subject compound.

EXAMPLE 5

1-(6-chloro-4-(trichloromethyl)-2-pyridyl)hexamethyleneimine

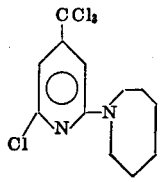

In this operation, 13.3 grams (0.05 mole) of 2,6-dichloro-4-(trichloromethyl) pyridine and 9.9 grams (0.1 mole) of hexamethyleneimine are dissolved in 100 ml. of toluene, and the mixture is heated for approximately 3 hours under reflux conditions. The solution is filtered to remove the solid imine salt present, following which the toluene present in the filtrate is distilled off. The remaining oily residue is taken up in hexane and the desired product is crystallized out of the hexane solution. The crystals are slurried in cold methanol and the remaining tan crystalline product is recovered by filtration. This material has a melting point of 75° C. and is insoluble in water and of good solubility in acetone and benzene. Infrared and NMR analyses establish the material to be 1-(6-chloro-4-(trichloromethyl) - 2 - pyridyl)hexamethyleneimine. Elemental analysis discloses the product to have carbon, hydrogen, chlorine and nitrogen contents of 44.2, 4.22, 43.04 and 8.67 percent, respectively, as against theoretical values of 43.7, 4.3, 42.8 and 8.53 percent, respectively, for the subject compound.

EXAMPLE 6

2-chloro-6-(dimethylamino)-4-(trichloromethyl) pyridine

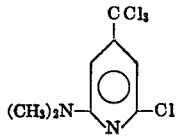

15.9 grams (0.06 mole) of 2,6-dichloro-4-(trichloromethyl) pyridine and 7.2 grams (0.2 mole) of dimethylamine (as a 40 percent aqueous solution) are added to 100 ml. of dimethylsulfoxide, and the resulting solution is heated for 2.5 hours at temperatures of from about 72°–85° C. The solution is cooled and poured into cold water. The solid product is filtered off, reslurried with water and re-filtered to remove any remaining contained dimethylsulfoxide. The solid product recovered from this operation is taken up in hexane and stirred with sodium sulfate to remove water and with Norit activated charcoal to remove colored impurities. The resulting mixture is filtered and the filtrate chilled to precipitate out the product (11.0 grams) as a white crystalline material melting at 83°–84° C. which is insoluble in water and of good solubility in acetone and benzene. This product is identified by infrared and NMR methods of analysis as 2-chloro-6-(dimethylamino)-4-(trichloromethyl) pyridine. Elemental analysis discloses the product to have carbon, hydrogen, chlorine and nitrogen contents of 35.06, 3.12, 51.66 and 10.27 percent, respectively, as against theoretical values of 35.0, 2.92, 51.8 and 10.3 percent, respectively, for the subject compound.

EXAMPLE 7

In reactions carried out in a manner similar to that described in Example 6, the following compounds are prepared:

2-chloro-4-cyano-6-(ethylamino) pyridine having a molecular weight of 181.62 by the reaction of 2,6-dichloro-4-cyanopyridine and ethylamine;

2-bromo-4-cyano-6-(methylamino) pyridine having a molecular weight of 212.05 by the reaction of 2,6-dibromo-4-cyanopyridine and methylamine;

4-cyano - 2 - fluoro-6-(isopropylamino) pyridine having a molecular weight of 179.2 by the reaction of 4-cyano-2,6-difluoropyridine and isopropylamine;

2-amino-4-chloro-6-(trichloromethyl) pyridine having a melting point of 78°–82° C., by the reaction of 2,4-dichloro-6-(trichloromethyl) pyridine and ammonia;

2-chloro-3-cyano-6-hydrazino pyridine having a melting point of 243° C. (with decomposition) by the reaction of hydrazine and 2,6-dichloro-3-cyanopyridine;

2-amino-6-bromo-4-(dichloromethyl) pyridine having a molecular weight of 255.94 by the electrolytic reduction of 2-amino-6-bromo-4-(trichloromethyl) pyridine;

2-fluoro - 6 - (methylamino)-4-(dichloromethyl) pyridine having a molecular weight of 219.05 by the electrolytic reduction of 2-fluoro - 6 - (methylamino)-4-(trichloromethyl) pyridine;

2-chloro-6-(allylamino)-4-(trichloromethyl) pyridine having a molecular weight of 285.96 by the reaction of 2,6-dichloro-4-(trichloromethyl) pyridine and allylamine;

2-amino-6-iodo-4-(trichloromethyl) pyridine having a molecular weight of 337.33 by the reaction of 2,6-diiodo-4-(trichloromethyl) pyridine and ammonia;

2 - bromo-6-(phenylamino)-4-(trichloromethyl) pyridine having a molecular weight of 516.39 by the reaction of 2,6-dibromo-4-(trichloromethyl) pyridine and phenylamine i.e. aniline);

2 - chloro-6-(cyclobutylamino)-4-(trichloromethyl) pyridine having a molecular weight of 299.99 by the reaction of 2,6-dichloro-4-(trichloromethyl) pyridine and cyclobutylamine;

2-chloro-6-(cyclopropylamino)-4-(trichloromethyl) pyridine having a molecular weight of 285.91 by the reaction of 2,6-dichloro-4-(trichloromethyl) pyridine and cyclobutylamine;

2-amino-6-chloro-3-cyano pyridine melting at 215°–216° C. in a 20 weight percent admixture with 6-amino-2-chloro-3-cyanopyridine melting at 196°–198° C.;

EXAMPLE 8

2-chloro-6-(ethylamino)-4-(trichloromethyl) pyridine

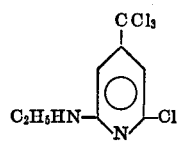

In a manner substantially the same as described in Example 4, 2 - chloro - 6 - ethylamino-4-(trichloromethyl) pyridine is produced as a yellow crystalline solid having a melting point of from 76°–84° C. which is insoluble in water and of good solubility in acetone and benzene, by the reaction of 2,6-dichloro-4-(trichloromethyl) pyridine with ethylamine.

EXAMPLE 9

2-chloro-6-(n-propylamino)-4-(trichloromethyl) pyridine

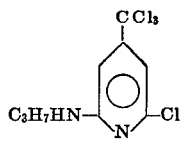

In a manner substantially the same as that described in Example 6, 2-chloro-6-(n-propylamino)-4-(trichloromethyl) pyridine, as a tan crystalline solid having a melting point of 82°–83° C., insoluble in water and of good solubility in acetone and benzene, is produced by reacting 2,6-dichloro-4-(trichloromethyl) pyridine with n-propylamine.

EXAMPLE 10

2-chloro-6-hydrazino-4-(trichloromethyl) pyridine

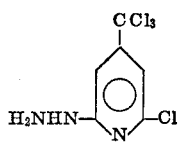

In this operation, 20.0 grams (0.08 mole) of 2,6-dichloro-4-(trichloromethyl) pyridine and 10 grams (0.17 mole) of hydrazine hydrate are dissolved in 100 milliliters of dimethoxyethane, and the solution is heated for 6 hours under reflux conditions. Some of the solvent is distilled off and the remaining solution is cooled and poured into water. The resulting solid precipitate is filtered from the aqueous system and taken up in boiling benzene. The solution is dried and decolorized with sodium sulfate and activated carbon and filtered. A portion of the benzene is distilled off, hexane is added and the solution is cooled to induce formation of a white crystalline product. This material is recovered in the amount of 11.0 grams as a white solid having a melting point of 131°–132° C. which is substantially insoluble in water and of good solubility in acetone and benzene. It is identified by infrared and NMR methods of analysis as 2 - chloro-6-hydrazino-4-(trichloromethyl) pyridine. Elemental analysis discloses the product to have carbon, hydrogen, chlorine and nitrogen contents of 28.0, 1.8, 53.68 and 16.2 percent, respectively, as against theoretical values of 27.6, 1.73, 53.42 and 16.1 percent, respectively, for the subject compound.

EXAMPLE 11

2-amino-6-chloro-4-cyano pyridine

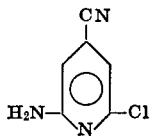

In this operation, 5 grams (0.02 mole) of 2,6-dichloro-4-cyanopyridine are dissolved in 35 milliliters of dimethylsulfoxide. Gaseous ammonia is bubbled through this solution for 6 hours as the solution is maintained at 100° C. The mixture is cooled and poured over ice. The solid component is filtered off and taken up in hot benzene, sodium sulfate is added and the mixture is again filtered. Hexane is added in portions to the filtrate and the solution allowed to stand, with successive crystalline fractions being collected. The crystalline product formed during the first 3 hours is discarded, and that which subsequently comes down (as a beige colored solid, M.P. 165°–167° C., being insoluble in water and of good solubility in acetone and benzene) is found by infrared and NMR analyses to be 2-amino-6-chloro-4-cyano pyridine. Elemental analysis discloses the product to have carbon, hydrogen, nitrogen and chlorine contents of 47.0, 2.8, 27.3 and 23.82 percent, respectively, as against theoretical values of 46.7, 2.62, 27.3 and 23.1 percent, respectively, for the subject compound.

EXAMPLE 12

2-amino-6-bromo-4-(trichloromethyl) pyridine

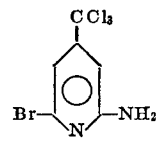

In a preparation similar to that of Example 2, 2-amino-6-bromo-4-(trichloromethyl) pyridine is prepared by heating together for one hour at 90° C. in a pressure vessel, 2,6 - dibromo - 4 - (trichloromethyl) pyridine and ammonia. The said product compound is a beige colored solid having a melting point of 128°–130° C. which is insoluble in water and of good solubility in acetone and benzene.

EXAMPLE 13

2-amino-6-chloro-4-(dichloromethyl) pyridine

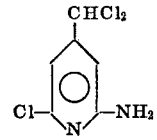

The foregoing compound is prepared by the electrolytic reduction of 2-amino-6-chloro-4-(trichloromethyl) pyridine, as hereinafter described. In a 400 milliliter beaker containing a 0.5 centimeter deep mercury layer at its bottom, is suspended, above the mercury, a permeable Alundum cup fitted in its center with a graphite rod. Appropriate electrical connections are made through a poteniostat so that the mercury pool functions as a cathode and the graphite rod as the anode. A saturated calomel reference electrode (SCE) is also suspended in the beaker. To the beaker is added a catholyte solution of 4.0 grams (0.02 mole) of 2-amino-6-chloro - 4 - (trichloromethyl) pyridine in 200 milliliters of a mixture of equal parts, by volume, of methanol and dimethoxyethane, the solution also containing 10 milliliters of water and 7.5 grams of ammonium acetate. To the Alundum cup (immersed in the catholyte) is added a methanol anolyte containing 10 percent water and 10 percent ammonium acetate. Electrolysis is carried out, with stirring of the mercury, for 2 hours at a cathode potential of —2.0 volts (with reference to the SCE) during which time 0.8 ampere per hour of current is passed. Vapor phase chromatographic analysis indicates the reaction is complete after said 2 hour interval. The catholyte solution is poured into 300 milliliters of water and extracted with three successive 100 milliliter portions of methylene chloride. Drying and evaporating the extracts gives 3.0 grams of colorless oil which solidifies on standing. This solid is recrystallized from a solution of 10 percent benzene in hexane to give 1.6 grams of off-white crystals having a melting point of 79°–83° C., said material being insoluble in water and of good solubility in benzene and acetone. Infrared and NMR analyses show the product to be 2-amino-6-chloro - 4 - (dichloromethyl) pyridine. Elemental analysis discloses the product to have carbon, hydrogen and nitrogen contents of 34.1, 2.3 and 13.3 percent, respectively, as against theoretical values for these components of 34.1, 2.4 and 13.2 percent, respectively, in the subject compound.

EXAMPLE 14

2-amino-3,5-dichloro-4-(trichloromethyl) pyridine

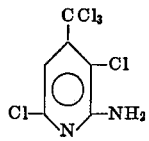

2-chloro-4-(trichloromethyl) pyridine is aminated with liquid ammonia in a bomb at 110° C. for 6 hours. Thereafter, the bomb is vented to evaporate off the excess ammonia and the remaining residue is slurried in cold water to remove any ammonium chloride present. The product is thereafter crystallized from a benzene-hexane solvent mixture. The crystallized product is dissolved in acetic acid and chlorine is added thereto, while keeping the temperature at about 20° C. The amount of chlorine added is slightly in excess of the stoichiometric amount needed. This chlorinated reaction product is allowed to stand for one-half hour and thereafter poured into cold water and the crude solid 2-amino-3,5-dichloro-4-(trichloromethyl) pyridine product which precipitates is recovered by filtration. The product is finally crystallized from a benzene-hexane solvent mixture. The product has a molecular weight of about 280.33.

The substituted amino halo pyridine compounds of the present invention are useful as pesticides and have particular utility as fungicides, bactericides and as agents for the control of various parasites which infect the intestinal tract of warm blooded animals. The compounds can be employed as pesticides by distributing the compound in a pesticidally-effective quantity and usually in the form of a composition containing adjuvants to aid in dispersing the same, so as to contact directly the organism to be controlled or, alternatively, so as to contact the growth medium or habitat of the organisms whereby eventual contact with said organisms will be established. For the control of bacterial and fungal pests, the active chemicals are applied in the form of compositions containing from 5 to 500 or more parts of the chemical per million parts by weight of the composition. In the control of other pests, a pesticidal amount which is also an anthlminticidal amount is used.

For such bactericidal, fungicidal and other pesticidal applications, the active compounds hereof can be employed in unmodified form or in the form of a liquid or finely divided solid composition. Thus, the compounds can be dispersed in a finely divided solid and employed as dusts. The compounds and such solid dispersions can also be dispersed in water with or without the aid of a surface active agent and the resulting aqueous suspensions employed as drenches or sprays. In other procedures, the compounds are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

In representative operations, the compounds 2-amino-6-bromo-4-(trichloromethyl) pyridine, 1-(6 - chloro - 4-(trichloromethyl)-2 - pyridyl) hexamethyleneimine, and 2-amino-6-fluoro-4-(trichloromethyl) pyridine each gave 100, 75 and 90 percent, respectively, kill and control of two-spotted spider mites when employed as the sole toxicant in aqueous treating compositions at a concentration of 500 parts per million by weight of the ultimate compositions.

In another operation, the compounds 1-(6-chloro-4-(trichloromethyl) - 2 - pyridyl) hexamethyleneimine, 2-chloro-6-(methylamino) - 4 - (trichloromethyl) pyridine and 2-amino-6-chloro-4-cyanopyridine each gave 90, 100 and 100 percent, respectively, kill and control of yellow fever mosquito larvae when employed as the sole toxicant in aqueous treating compositions at a concentration of 1.0, 5.0 and 1.0, respectively, parts per million by weight of the ultimate compositions.

In an additional operation, 2-amino-6-fluoro - 4 - (trichloromethyl) pyridine is found to give 84 percent kill and control of Southern army worm when employed as the sole toxicant in an aqueous treating composition at a concentration of 500 parts per million by weight of the ultimate composition.

In another representative operation, the compounds 2-chloro-6-(ethylamino) - 4 - (trichloromethyl) pyridine and 2-chloro-6-(1-pyrrolidinyl)-4-(trichloromethyl) pyridine each are found to give 100 percent control of the roundworms Haemonchus ssp, Trichostrongylus ssp, Cooperia ssp, Ostertagia ssp, Esophogastomum ssp and Bunostomum ssp when employed as the sole toxicant to treat cultures of the said roundworms in the egg stage at a concentration of 300 parts per million by weight of said culture; said control being the prevention of maturation of said eggs into larvae.

In other representative operations, each of the compounds 2-amino-6-fluoro-4-(trichloromethyl) pyridine, 2 - amino - 6 - bromo - 4 - (trichloromethyl) pyridine and 2-amino-6-chloro-4-cyanopyridine, when employed as the sole toxicant in a nutrient agar at a concentration of about 500 parts by weight of the compound per million parts of agar, is found to give 100 percent kill and control of *Trichophton mentagrophytes*, a causative agent of athletes foot and ringworm. In further operations, each of the compounds 2-amino-6-chloro-4-(dichloromethyl) pyridine,
2-chloro-6-(dimethylamino)-4-(trichloromethyl) pyridine,
2-chloro-6-hydrazino-4-(trichloromethyl) pyridine,
2-chloro-6-(methylamino)-4-(trichloromethyl) pyridine, and
2-chloro-6-(ethylamino)-4-(trichloromethyl) pyridine is found to give 100 percent kill and control of *Trichophton mentagrophytes* at a concentration of 100 parts by weight of the compound per million parts of the nutrient agar.

In other operations, each of the compounds 2-amino-6-chloro-4-(trichloromethyl) pyridine,
2-amino-6-fluoro-4-(trichloromethyl) pyridine,
2-chloro-6-hydrazino-4-(trichloromethyl) pyridine,
2-amino-6-chloro-4-(dichloromethyl) pyridine,
2-amino-6-chloro-4-cyanopyridine and
2-amino-6-bromo-4-(trichloromethyl) pyridine, when employed as the sole toxicant in a nutrient agar at a concentration of about 500 parts by weight of the compound per million parts of agar, is found to give 100 percent kill and control of *Staphylococcus aureus*, a causative agent of boils. Similarly, at the same concentrations, each of the compounds 2-amino-6-fluoro-4-(trichloromethyl) pyridine and 2-amino - 6 - chloro-4-(dichloromethyl) pyridine are found to give 100 percent kill and control of *Candida albicans*, a causative agent of infectious yeast. In another operation, employing the same concentration, the compound 2-chloro-6-(methylamino)-4-(trichloromethyl) pyridine is found to give 100 percent control of *Salmonella pullorum*, a causative agent of poultry intestinal infections.

When applied at a dosage level of from about 100 to 1,000 parts per million, each of the compounds of the present invention, the utility of which is not specifically recited above, has the ability to kill, inhibit or otherwise control one or more of the aforementioned or other fungal, bacterial or parasital pests.

Preparation of starting materials

The pyridine compounds substituted with one, two or three ring chlorine atoms and a trichloromethyl substituent for use as starting materials in preparing the corresponding mono- or dichloro-derivative compounds of the present invention can be prepared by contacting an appropriate methylpyridine and hydrogen chloride at temperatures of about 50° C. to produce a liquid methylpyridine hydrochloride composition and thereafter passing chlorine gas through the liquid mixture at temperatures of about 95°–110° C. while irradiating the mixture. The desired monochloro-, dichloro- or trichloro-(trichloromethyl) pyridine compounds can then be distilled from the reaction product. In another preparation, these pyridine compounds can be prepared by rapidly mixing, in the vapor phase, chlorine, an appropriate methylpyridine compound an inert diluent and subjecting the mixture to temperatures of about 400°–490° C. for a brief contact time. The desired products can then be distilled from the resulting product stream. Essentially these same methods of chlorination can be followed when starting with a cyanopyridine rather than a methylpyridine. Having produced the foregoing ring substituted monochloro-, dichloro- or trichloropyridine compound starting materials, the corresponding ring substituted bromo products can be obtained by known methods wherein the appropriate chloro product is reacted with hydrogen bromide in an appropriate solvent. Thus, in an acetic acid solvent, the solution is heated at reflux (110° C.) for several hours, following which the mixture is poured over ice to precipitate the desired product which can then be recovered and purified by conventional means. The corresponding ring substituted fluoro compounds are obtained by reacting the appropriate chloro compound with potassium fluoride in a suitable solvent, e.g., dimethylformamide, heating the solution at 125° C. for 6 to 12 hours, followed by appropriate recovery operations. The corresponding ring substituted iodo compounds are obtained by reacting the appropriate chloro compound with sodium iodide in an appropriate solvent. Thus, in a solvent such as dimethylsulfoxide, the mixture is heated at 100°–110° C. for about 20 hours, following which the mixture is poured into water to precipitate the desired product which can then be recovered and purified by conventional procedures. In one such procedure, the desired product can be separated from the water by filtration and the crude solid product subjected to fractional crystallization from a solvent such as benzene.

What is claimed is:

1. The substituted aminohalopyridine compounds corresponding to the formula

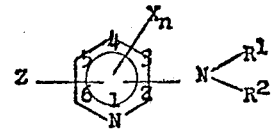

wherein X represents chloro, bromo, iodo or fluoro; $n$ represents an integer of 1 or 2; Z represents cyano; $R^1$ represents hydrogen, loweralkyl of 1 to 4 carbon atoms or loweralkenyl of 2 to 4 carbon atoms; $R^2$ represents hydrogen, loweralkyl of 1 to 4 carbon atoms, loweralkenyl of 2 to 4 carbon atoms, cycloalkyl of 3 to 4 carbon atoms or phenyl.

2. The compound as defined in claim 1 which is 2-amino-6-chloro-4-cyanopyridine.

3. The compound as defined in claim 1 which is 2-amino-6-chloro-3-cyanopyridine.

4. The compound as defined in claim 1 which is 6-amino-2-chloro-3-cyanopyridine.

References Cited

Berrie et al., Journal of the Chem. Soc., London, pp. 2042–46 (1952).

Holland et al., Journal of Med. Chem., vol. 10, pp. 149–154 (1967).

ALAN L. ROTMAN, Primary Examiner

U.S. Cl. X.R.

260—296 R, 293.69; 424—263, 267

PO-1050
(5/69)

UNITED STATES PATENT OFFICE
CERTIFICATE OF CORRECTION

Patent No. 3,799,935                    Dated       March 26, 1974

Inventor(s)   Howard Johnston

It is certified that error appears in the above-identified patent and that said Letters Patent are hereby corrected as shown below:

Column 3, line 9, change "derivatives" to -- derivative --;

Column 3, line 14, change "or", 2nd occ. to -- of --

Column 6, line 48, change "cyclobutylamine" to -- cyclopropylamine --

Column 8, line 44, correct spelling of "potentiostat";

Column 9, line 5, the formula should appear as follows:

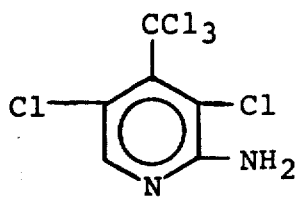

Column 9, line 45, correct spelling of "anthelminticidal".

Signed and sealed this 5th day of November 1974.

(SEAL)
Attest:

McCOY M. GIBSON JR.                        C. MARSHALL DANN
Attesting Officer                          Commissioner of Patents